(12) United States Patent
Silitonga (10) Patent No.: US 7,068,007 B2
(45) Date of Patent: Jun. 27, 2006

(54) STEPPING MOTOR DRIVING SYSTEM AND STEPPING MOTOR DRIVING PROCESS (75) Inventor: Charles Simson Silitonga, Kiryu (JP)

(73) Assignee: Japan Servo Co., Ltd., Tokyo (JP)

( * ) Notice: Subject to any disclaimer, the term of this patent is extended or adjusted under 35 U.S.C. 154(b) by 0 days.

(21) Appl. No.: 11/254,661

(22) Filed: Oct. 21, 2005

(65) Prior Publication Data
US 2006/0087276 A1 Apr. 27, 2006

(30) Foreign Application Priority Data

Oct. 26, 2004 (JP) ............................. 2004-310531
Nov. 17, 2004 (JP) ............................. 2004-332617

(51) Int. Cl.
*G05B 19/40* (2006.01)

(52) U.S. Cl. ...................... 318/685; 318/671; 318/560; 310/49

(58) Field of Classification Search ................ 318/685, 318/671, 560; 310/49
See application file for complete search history.

(56) References Cited

U.S. PATENT DOCUMENTS

| | | | | |
|---|---|---|---|---|
| 4,743,824 A | * | 5/1988 | Andersson | 318/696 |
| 4,908,562 A | * | 3/1990 | Back | 318/696 |
| 5,485,070 A | * | 1/1996 | Tominaga | 318/696 |
| 5,982,134 A | * | 11/1999 | Tanaka | 318/696 |
| 6,078,156 A | * | 6/2000 | Spurr | 318/368 |
| 6,288,507 B1 | * | 9/2001 | Makino et al. | 318/293 |
| 6,806,675 B1 | * | 10/2004 | Wang et al. | 318/685 |
| 6,930,458 B1 | * | 8/2005 | Akiyama et al. | 318/376 |

FOREIGN PATENT DOCUMENTS

JP 2002-281788 A 9/2002

\* cited by examiner

*Primary Examiner*—Rita Leykin
(74) *Attorney, Agent, or Firm*—Birch, Stewart, Kolasch & Birch, LLP (57) ABSTRACT

A stepping motor driving system and process according to the present invention controls a switching element in such a manner that motor supply current is passed through a motor coil until a coil current detection value reaches an upper limit set point, motor reflux current is passed through the motor coil until predetermined time elapses since the motor supply current begins to flow after the coil current detection value reached the upper limit set point, motor regeneration current is passed through the motor coil until the coil current detection value reaches a lower limit set point when predetermined time has passed, and motor reflux current is passed through the motor coil until predetermined time elapse since the motor regeneration current begins to flow after the coil current detection value reached the lower limit set point.

8 Claims, 5 Drawing Sheets

STEPPING MOTOR DRIVING SYSTEM AND STEPPING MOTOR DRIVING PROCESS

BACKGROUND OF THE INVENTION

1. Field of the Invention

This invention relates to a stepping motor driving system for driving a stepping motor used in a printer, a copying machine, a robot or the like, and a process for driving a stepping motor.

2. Description of the Prior Art

In an example of conventional stepping motor driving systems, motor supply current is passed through a motor coil until a coil current detection value reaches a upper limit set point. When the coil current detection value has reached the upper limit set point, motor regeneration current is passed through the motor coil until first predetermined time elapses. When the first predetermined time has passed, motor reflux current is passed through the motor coil until second predetermined time elapses since the motor supply current begins to pass through the motor coil. When the second predetermined time has passed, the motor supply current is passed through the motor coil until the coil current detection value reaches the upper limit set point. When the coil current detection value has reached the upper limit set point, the motor regeneration current is passed through the motor coil until the first predetermined time elapses. Thereafter, the same control is performed.

In another conventional stepping motor driving system, motor supply current is passed through a motor coil until supply time that corresponds to a supply time signal elapses. When the supply time has passed, motor regeneration current is passed through the motor coil until fixed regeneration time that corresponds to a regeneration time signal passes. When the regeneration time has passed, motor reflux current is passed through the motor coil until predetermined time elapses since the motor supply current begins to pass through the motor coil. When the predetermined time has passed, the motor supply current is passed through the motor coil until the supply time elapses. When the supply time has passed, the motor regeneration current is passed through the motor coil until the regeneration time passes. Thereafter, the same control is performed.

However, in such stepping motor driving systems, time that the motor reflux current flows becomes constant, so that there is a possibility that distortion in the coil current is increased at a certain rotation speed and a ripple current is increased. Therefore, a vibration of the motor is increased, high-speed response characteristics are deteriorated and a step angle precision in a micro step is decreased. In particular, when digitizing processing-control is performed, such problems are noticeable.

SUMMARY OF THE INVENTION

It is therefore an object of the present invention to provide a system and a process for driving a stepping motor, in which a ripple current is minimized.

In accordance with one aspect of the present invention, there is provided a stepping motor driving system having an independent winding. The stepping motor driving system comprises a switching element for controlling current that flows through a motor coil, a current detecting means for detecting the current flowing through the motor coil, and a switching element controlling means for controlling the switching element on the basis of a motor current detection value that is an output of the current detection means, the switching element controlling means being adapted to control the switching element in such a manner that motor supply current is passed through the motor coil until the coil current detection value reaches an upper limit set point, motor reflux current is passed through the motor coil until predetermined time passes since the motor supply current begins to flow after the coil current detection value reached the upper limit set point, motor regeneration current is passed through the motor coil until the coil current detection value reaches a lower limit set point when the predetermined time passes, and motor reflux current is passed through the motor coil until predetermined time passes since the motor regeneration current begins to flow after the coil current detection value reached the lower limit set point.

According to a further aspect of the present invention, there is provided a process for driving a stepping motor having an independent winding, utilizing a stepping motor driving system that comprises a switching element for controlling current that flows through a motor coil, a current detecting means for detecting the current flowing through the motor coil, and a switching element controlling means for controlling the switching element on the basis of a motor current detection value that is an output of the current detection means. The stepping motor driving process comprises the steps of controlling the switching element by the switching element controlling means, causing motor supply current to flow through the motor coil until the coil current detection value reaches an upper limit set point, causing motor reflux current to flow through the motor coil until predetermined time elapses since the motor supply current begins to flow after the coil current detection value reached the upper limit set point, causing motor regeneration current to flow through the motor coil until the coil current detection value reaches a lower limit set point when the predetermined time has passed, and causing motor reflux current to flow through the motor coil until predetermined time elapses since the motor regeneration current begins to flow after the coil current detection value reached the lower limit set point.

According to a further aspect of the present invention, there is provided a stepping motor driving system for driving a stepping motor having an independent winding. The stepping motor driving system comprises a switching element for controlling current that flows through a motor coil, a current detecting means for detecting the current flowing through the motor coil, and a switching element controlling means for controlling the switching element on the basis of a motor current detection value that is an output of the current detection means, the switching element controlling means being adapted to control the switching element in such a manner that motor supply current is passed through the motor coil until supply time corresponding to the coil current detection value and a target current value elapses, motor reflux current is passed through the motor coil until predetermined time passes since the motor supply current begins to flow after the supply time passed, motor regeneration current is passed through the motor coil until regeneration time corresponding to a command speed elapses when the predetermined time has passed, and motor reflux current is passed through the motor coil until predetermined time passes since the motor regeneration current begins to flow after the regeneration time passed.

In accordance with a further aspect of the present invention, there is provided a process for driving a stepping motor having an independent winding, utilizing a stepping motor driving system that comprises a switching element for controlling current that flows through a motor coil, a current detecting means for detecting the current flowing through the motor coil, and a switching element controlling means for controlling the switching element on the basis of a motor current detection value that is an output of the current detection means. The stepping motor driving process comprises the steps of controlling the switching element by the switching element controlling means, causing motor supply current to flow through the motor coil until supply time corresponding to the coil current detection value and a target current value elapses, causing motor reflux current to flow through the motor coil until predetermined time elapses since the motor supply current begins to flow after the supply time passed, causing motor regeneration current to flow through the motor coil until regeneration time corresponding to a command speed elapses when the predetermined time has passed, and causing motor reflux current to flow through the motor coil until predetermined time elapses since the motor regeneration current begins to flow after the regeneration time passed.

In the stepping motor driving system and process according to the present invention, the motor regeneration current is passed through the motor coil until the coil current detection value reaches the lower limit set point or until the regeneration time corresponding to the command speed elapses, so that a ripple current is minimized regardless of rotation speed.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference numerals denote the same parts throughout the Figures and wherein.

DETAILED DESCRIPTION OF THE INVENTION

Figure 1:
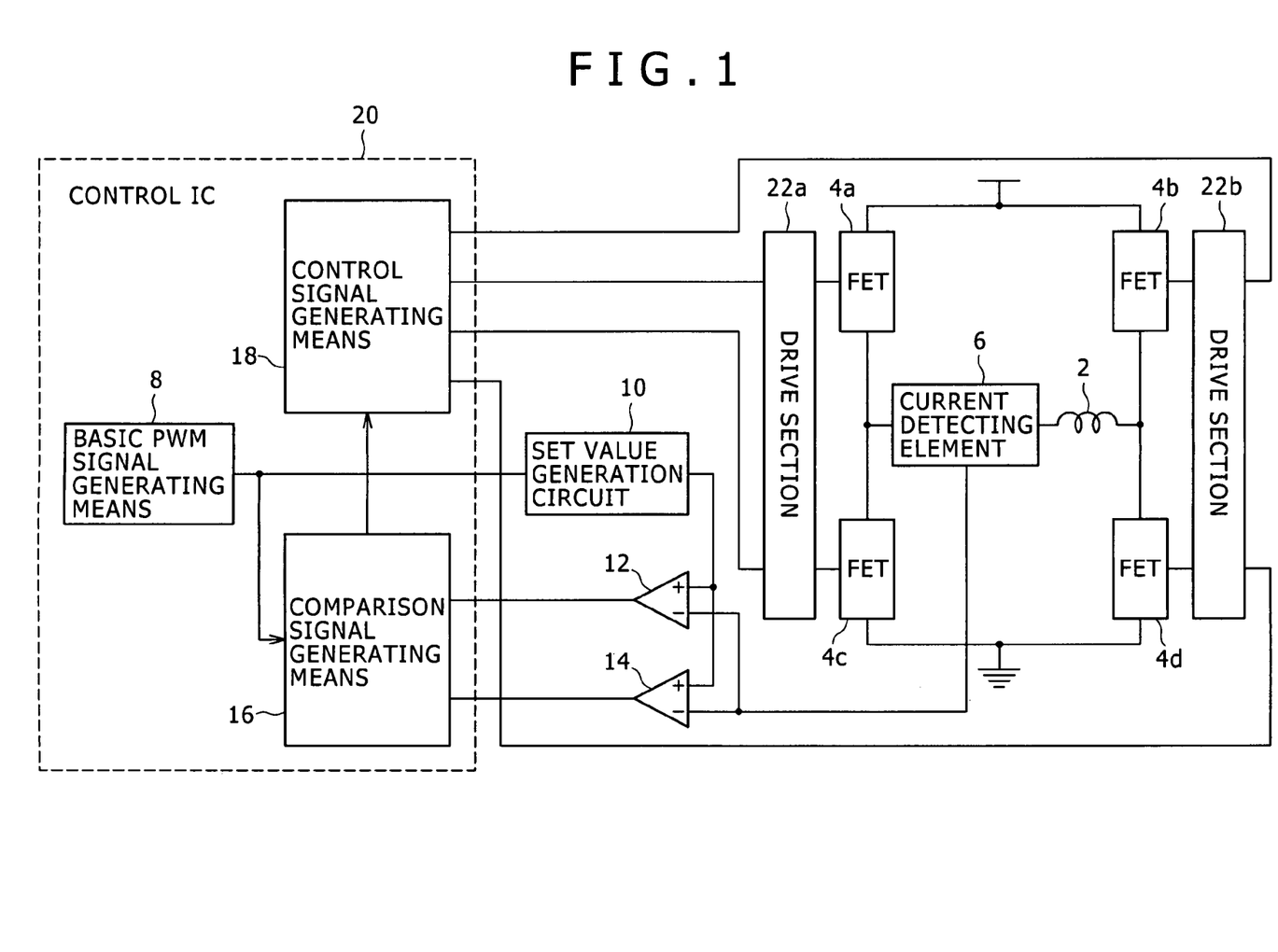
FIG. 1 is a schematic view illustrating a stepping motor driving system according to a first embodiment of the present invention.

Referring to FIG. 1, a stepping motor driving system according to the present invention will be discussed hereinafter. FIG. 1 is a schematic view illustrating a stepping motor driving system for driving a stepping motor having a three-phase-independent winding. In FIG. 1, only U-phase section of the stepping motor is shown. A construction of a V-phase section of the stepping motor and a construction of a W-phase section of the stepping motor are similar to that of the U-phase section, so that illustration of them is omitted. Power MOSFET's (U1H, U2H) 4a, 4b are provided between a motor coil 2 and a power source. Power MOSFET's (U1L, U2L) 4c, 4d are provided between the motor coil 2 and a ground. The power MOSFET's 4a–4d are connected in an H-bridge shape and constitute an H-bridge-type switching element for controlling an electric current that flows through the motor coil 2. A current detecting element (current detecting means) 6 for detecting the electric current flowing through the motor coil 2 is provided in a series with the motor coil 2. In the illustrated embodiment, a 0–5V output signal current sensor is employed as the current detecting element 6. There is provided a basic PWM signal generating means 8 that generates a basic PWM signal of 50% duty utilizing a high-accuracy basic clock generator. There is provided a set value generating circuit 10 that outputs an upper limit set point when the basic PWM signal is ON, and outputs a lower limit set point when the basic PWM signal is OFF. There is provided a first comparator 12 for making a comparison between a coil current detection value and the upper limit set point. There is provided a second comparator 14 for making a comparison between the coil current detection value and the lower limit set point. There is provided a comparison signal generating means 16 for generating a maximum comparison signal representing that the coil current detection value reaches the upper limit set point and for generating a minimum comparison signal representing that the coil current detection value reaches the lower limit set point, on the basis of the basic PWM signal and outputs of the comparators 12, 14. The comparison signal generating means 16 generates the maximum comparison signal that becomes ON when the basic PWM signal becomes ON and that becomes OFF when the coil current detection value reaches the upper limit set point and the output of the comparator 12 becomes zero. Furthermore, the comparison signal generating means 16 generates the minimum comparison signal that becomes ON when the basic PWM signal becomes OFF and that becomes OFF when the coil current detection value reaches the lower limit set point and the output of the comparator 14 becomes zero. Also, there is provided a control signal generating means 18 for outputting control signals for the power MOSFETS's 4a–4d, on the basis of the output of the comparison signal generating means 16. The control signal generating means 18 outputs a control signal for causing the power MOSFET 4a to be turned off when the minimum comparison signal becomes ON, and outputs a control signal for causing the power MOSFET 4a to be turned on when the minimum comparison signal becomes OFF. Furthermore, the control signal generating means 18 outputs a control signal for causing the power MOSFET 4d to be turned on when the maximum comparison signal becomes ON, outputs a control signal for causing the power MOSFET 4d to be turned off when the maximum comparison signal becomes OFF, and outputs a control signal for causing the power MOSFET's 4b, 4c to be always turned off. That is, the control signal generating means 18 outputs a control signal for causing the power MOSFET's 4a, 4d to be turned on and causing the power MOSFET's 4b, 4c to be turned off until the maximum comparison signal becomes OFF after the maximum comparison signal became ON. The control signal generating means 18 outputs a control signal for causing the power MOSFET 4a to be turned on and causing the power MOSFET's 4b–4d to be turned off until the minimum comparison signal becomes ON after the maximum comparison signal became OFF. The control signal generating means 18 outputs a control signal for causing the power MOSFET's 4a–4d to be turned off until the minimum comparison signal becomes OFF when the minimum comparison signal has become ON. The control signal generating means 18 outputs a control signal for causing the power MOSFET 4a to be turned on and causing the power MOSFET's 4b–4d to be turned off, until the maximum comparison signal become ON after the minimum comparison signal became OFF. There are provided drive sections 22a, 22b for causing the control signals outputted from the control signal generating means 18 to be brought to such a level in which the power MOSFET's 4a–4d can switch the control signals. The basic PWM signal generating means 8, the comparison signal generating means 16, and the control signal generating means 18 are comprised of a control IC (ASIC) 20. Furthermore, the set value generating circuit 10, the comparators 12, 14, the basic PWM signal generating means 8, the comparison signal generating means 16, the control signal generating means 18 constitute a switching element controlling means. The switching element controlling means controls the power MOSFET's 4a–4d in such a manner that the motor supply current is passed through the motor coil 2 until the coil current detection value reaches the upper limit set point, motor reflux current is passed through the motor coil 2 until predetermined time elapses since the motor supply current is passed through the motor coil 2 after the coil current detection value reached the upper limit set point, motor regeneration current is passed through the motor coil 2 until the coil current detection value reaches the lower limit set point when the predetermined time has passed, and the motor reflux current is passed through the motor coil 2 until predetermined time elapses since the motor regeneration current begins to be passed through the motor coil 2 after the coil current detection value reached the lower limit set point.

Figure 2:
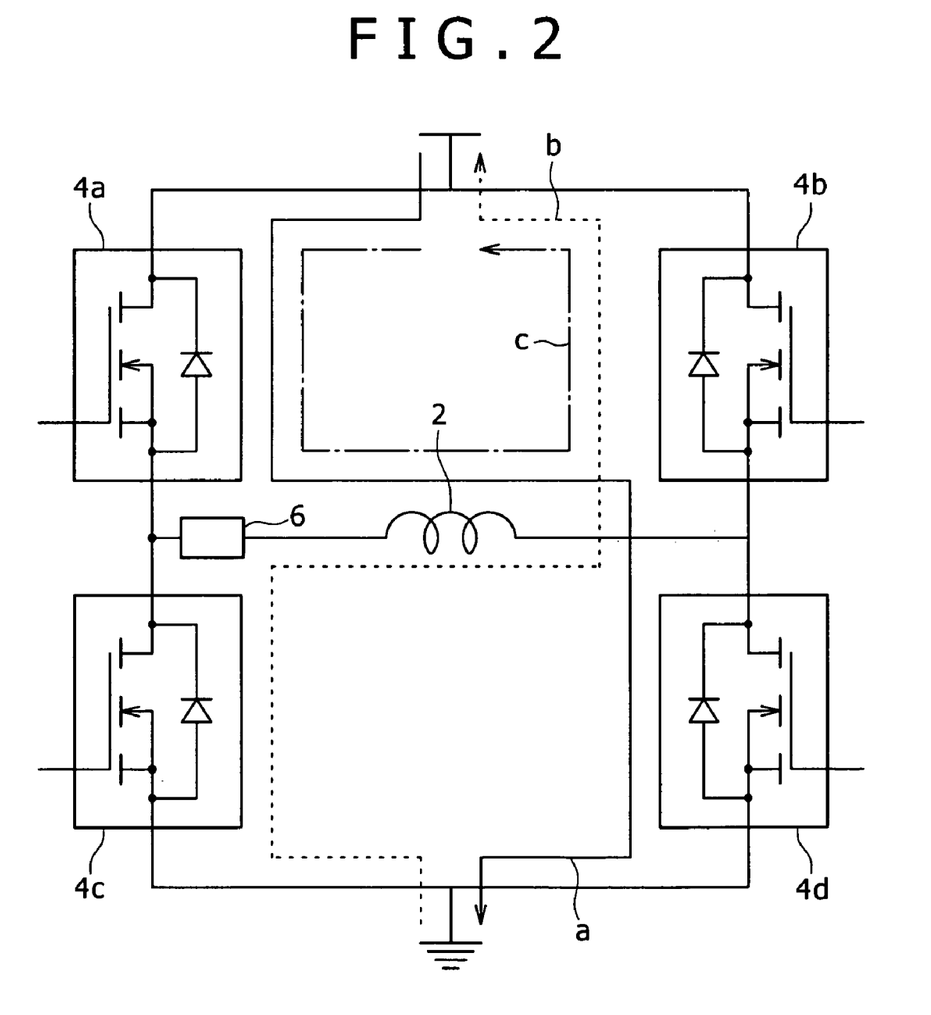
FIG. 2 is a detail view illustrating a switching element section of the stepping motor driving system shown in FIG. 1.

FIG. 2 is a detail view illustrating the power MOSFET section of the stepping motor driving system shown in FIG. 1. When the power MOSFET's 4a, 4d are ON and the power MOSFET's 4b, 4c are OFF, the motor supply current flows in such a manner as to be indicated by a line a in FIG. 2. Furthermore, when the power MOSFET's 4a–4d are OFF, the motor regeneration current flows in such a manner as to be indicated by a line b in FIG. 2. When the power MOSFET 4a is ON and the power MOSFET's 4b–4d are OFF, the motor reflux current flows in such a manner as to be indicated by a line c in FIG. 2.

Figure 3:
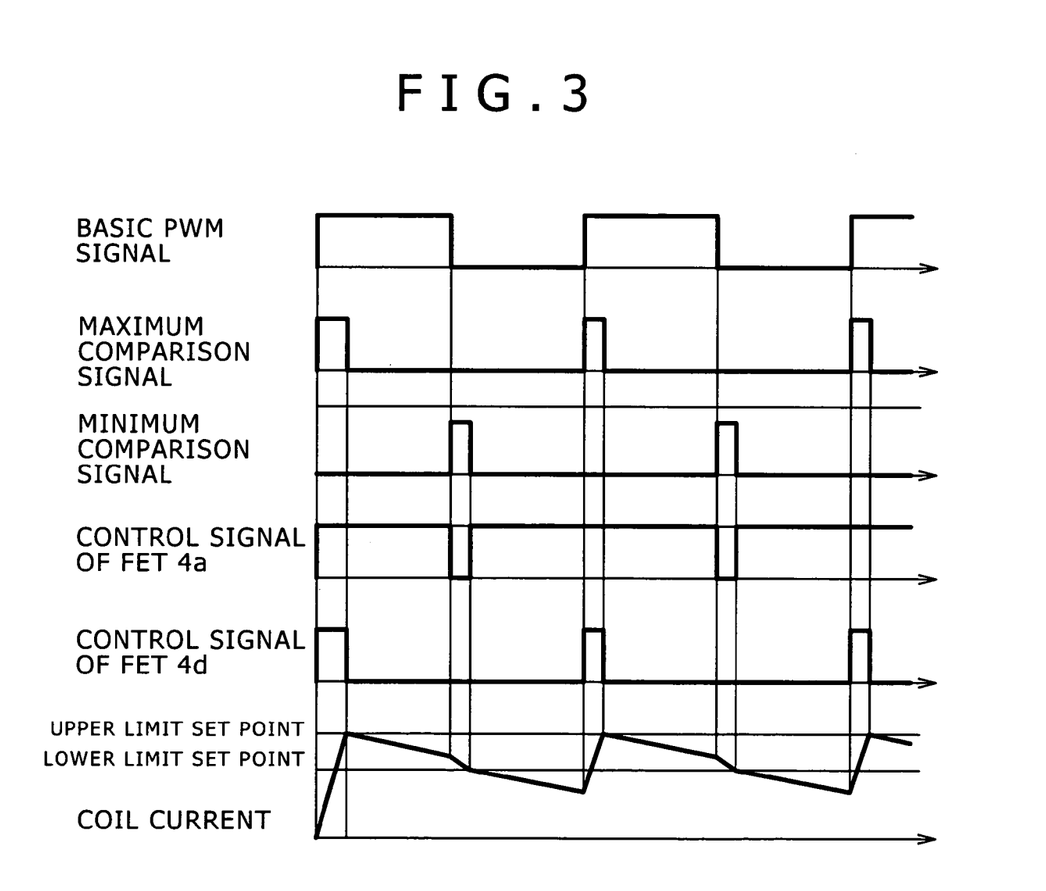
FIG. 3 is a graphical representation which is of assistance in explaining the operation of the stepping motor driving system shown in FIG. 1.

Referring now to FIG. 3, the operation of the stepping motor driving system shown in FIG. 1, namely, a stepping motor driving process according to the present invention will be discussed hereinafter. First of all, when the basic PWM signal becomes ON, the maximum comparison signal becomes ON, so that the control signal generating means 18 outputs the control signal for causing the power MOSFET's 4a, 4d to be turned on and causing the power MOSFET's 4b, 4c to be turned off. Therefore, the motor supply current is passed through the motor coil 2 and the coil current is increased. Then, when the coil current detection value reaches the upper limit set point, the maximum comparison signal becomes OFF, so that the control signal generating means 18 outputs the control signal for causing the power MOSFET 4a to be turned on and causing the power MOSFET's 4b–4d to be turned off. Therefore, the motor reflux current is passed through the motor coil 2 and the coil current is gradually decreased. Then, when the basic PWM signal becomes OFF, the minimum comparison signal becomes ON, so that the control signal generating means 18 outputs the control signal for causing the power MOSFET's 4a–4d to be turned off. Therefore, the motor regeneration current is passed through the motor coil 2 and the coil current is decreased. Then, when the coil current detection value reaches the lower limit set point, the minimum comparison signal becomes OFF, so that the control signal generating means 18 outputs the control signal for causing the power MOSFET 4a to be turned on and causing the power MOSFET's 4b–4d to be turned off. Therefore, the motor reflux current is passed through the motor coil 2 and the coil current is gradually decreased. Then, when the basic PWM signal becomes ON, the maximum comparison signal becomes ON, so that the control signal generating means 18 outputs the control signal for causing the power MOSFET's 4a, 4d to be turned on and causing the power MOSFET's 4b, 4c to be turned off. Therefore, the motor supply current is passed through the motor coil 2 and the coil current is increased. Thereafter, the coil current is controlled in the same manner.

In such a stepping motor driving system and a stepping motor driving process, the motor regeneration current is passed through the motor coil 2 until the coil current detection value reaches the lower limit set point, so that time that the motor reflux current flows is varied depending upon the coil current. Therefore, distortion in the coil current is minimized regardless of rotation speed and a ripple current is minimized. Consequently, vibration of the motor is decreased regardless of the rotation speed of the stepping motor, high-speed rotation response characteristics are improved and a stepping angle precision of a micro step is improved. Furthermore, the control signal generating means 18 outputs the control signals for the power MOSFET's 4a–4d on the basis of the basic PWM signal of 50% duty, so that the control signal generating means 18 can create control signals having stable PWM frequencies. Therefore, a vibration phenomenon can be prevented from occurring. Furthermore, the 0–5V output signal current sensor is employed as the current detecting element 6, so that it is unnecessary to cause the output of the current detecting element 6 to be amplified. Therefore, error in the coil current detection value can be suppressed, so that a motor rotation property is not adversely affected.

Figure 4:
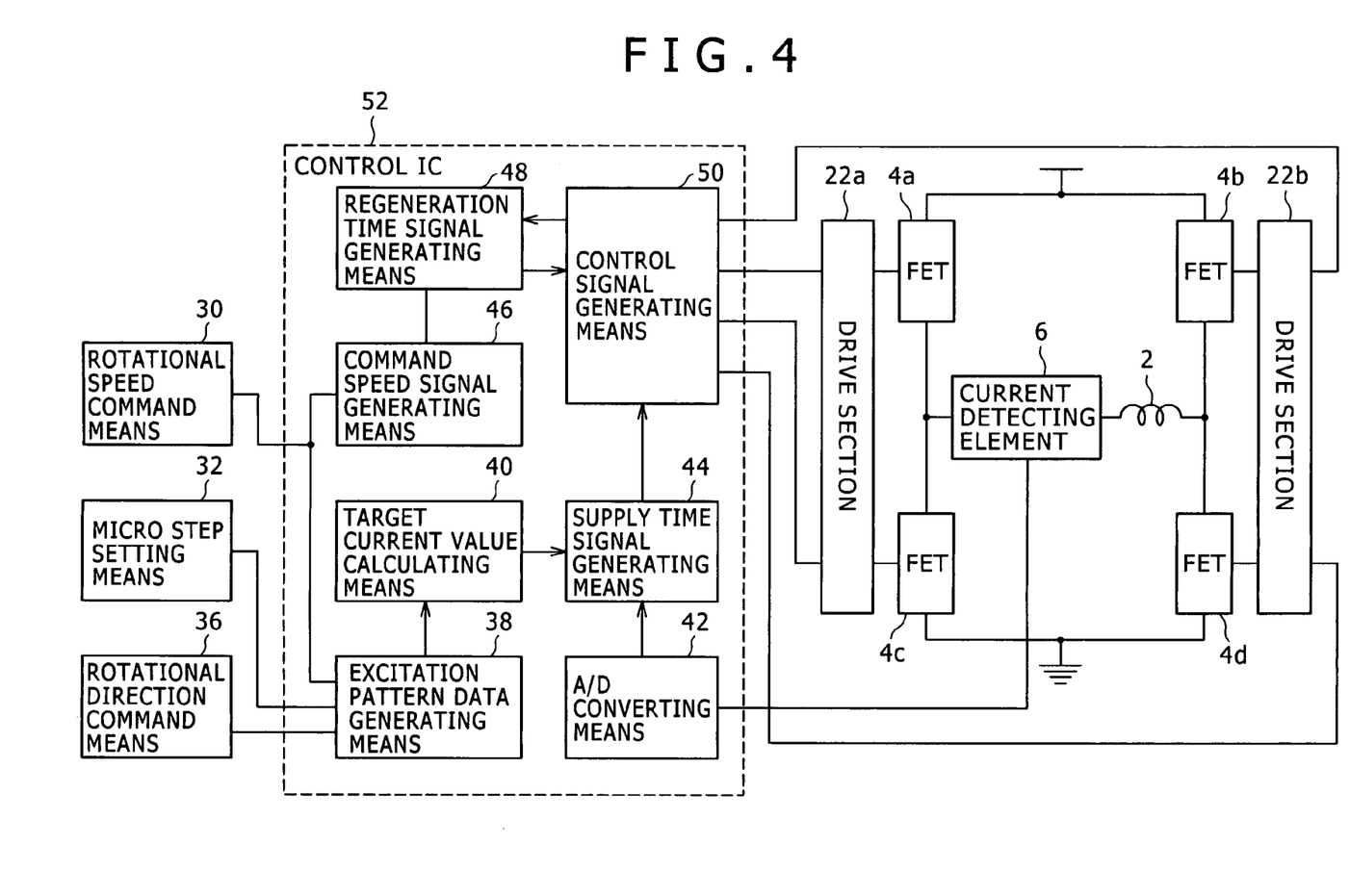
FIG. 4 is a schematic view illustrating a stepping motor driving system according to a second embodiment of the present invention.

Referring to FIG. 4, a stepping motor driving system according to a second embodiment of the present invention will be discussed hereinafter. FIG. 4 is a schematic view illustrating a stepping motor driving system for driving a stepping motor having a three-phase-independent winding. In FIG. 4, only U-phase section of the stepping motor is shown. A construction of a V-phase section of the stepping motor and a construction of a W-phase section of the stepping motor are similar to that of the U-phase section, so that illustration of them is omitted. There is provided a rotational speed command means 30 for outputting a pulse train depending upon a rotational speed command. There is provided a micro step setting means 32 for outputting the number of splitting of steps. There is provided a rotational direction command means 36 for commanding a rotational direction. There is provided an excitation pattern data generating means 38 for generating excitation pattern date on the basis of the pulse train, the number of splitting of the steps and the rotational direction. There is provided a target current value calculating means 40 for calculating a target current value on the basis of the excitation pattern data. There is provided an A/D converting means 42 for converting a coil current detection value of an analog that is the output of the current detecting element 6, into a coil current detection value of a digital. There is provided a supply time signal generating means 44 for generating a supply time signal that corresponds to time required in order that the motor supply current flows, namely, supply time, on the basis of the target current value and the coil current detection value. There is provided a command speed signal generating means 46 for generating a command speed signal by counting the pulse train from the rotational speed command means 30. There is provided a regeneration time signal generating means 48 for generating regeneration time signal that corresponds to time required in order that a motor regeneration current flows, namely, regeneration time, on the basis of the command speed signal. The regeneration time signal generating means 48 includes a regeneration time data table indicating a relationship between the speed command and the regeneration time, and creates the regeneration time signal from the command speed signal through the regeneration time data table. There is provided a control signal generating means 50 for generating a high-precision basic PWM signal of 50% duty and generating control signals for the power MOSFET's 4a–4d on the basis of the basic PWM signal, the supply time signal and the regeneration time signal. An output of the control signal generating means 50 is inputted to drive sections 22a, 22b. The control signal generating means 50 outputs a control signal for causing the power MOSFET 4a to be turned off when the basic PWM signal becomes OFF, and outputs a control signal for causing the power MOSFET 4a to be turned on after the regeneration time corresponding to the regeneration time signal elapsed from the time when the power MOSFET 4a was turned off. Furthermore, the control signal generating means 50 outputs a control signal for causing the power MOSFET 4d to be turned on when the basic PWM signal becomes ON, outputs a control signal for causing the power MOSFET 4d to be turned off after the supply time corresponding to the supply time signal elapsed from the time when the power MOSFET 4d was turned on, and outputs a control signal for causing the power MOSFET's 4b, 4c to be always turned off. That is, the control signal generating means 50 outputs control signals for causing the power MOSFET's 4a, 4d to be turned on and causing the power MOSFET's 4b, 4c to be turned off, until the supply time corresponding to the supply time signal elapses. Furthermore, the control signal generating means 50 outputs control signals for causing the power MOSFET 4a to be turned on and causing the power MOSFET's 4b–4d to be turned off until predetermined time elapses from the time when the power MOSFET's 4a, 4d are turned on after the supply time passed. The control signal creating means 50 outputs a control signal for causing the power MOSFET's 4a–4d to be turned off until the regeneration time elapses after the predetermined time passes. Furthermore, the control signal generating means 50 outputs a control signal for causing the power MOSFET 4a to be turned on and causing the power MOSFETS's 4b–4d to be turned off until predetermined time elapse from the time when the power MOSFET 4a is turned off after the regeneration time passed. The control signal generating means 50 outputs a control signal for causing the power MOSFET's 4a, 4d to be turned on and causing the power MOSFET's 4b, 4c to be turned off, until the supply time corresponding to the supply time signal passes after the predetermined time passed. Thereafter, the same control signals are outputted. The excitation patter data generating means 38, the target current value calculating means 40, the A/D converting means 42, the supply time signal generating means 44, the command speed signal generating means 46, the regeneration time signal generating means 48, and the control signal generating means 50 constitute a switching element controlling means. The switching element controlling means controls the power MOSFET's 4a–4d in such a manner that the motor supply current is passed through the motor coil 2 until the supply time that corresponds to the coil current detection value and the target current value passes, the motor reflux current is passed through the motor coil 2 until predetermined time passes since the motor supply current begins to flow after the supply time passed, the motor regeneration current is passed through the motor coil 2 until the regeneration time corresponding to the command speed passes when the predetermined time passed, and the motor reflux current is passed through the motor coil 2 until predetermined time elapses since the motor regeneration current begins to flow after the regeneration time passed. Furthermore, the switching element controlling means is comprised of a control IC (ASIC) 52 for performing a digitizing process.

Figure 5:
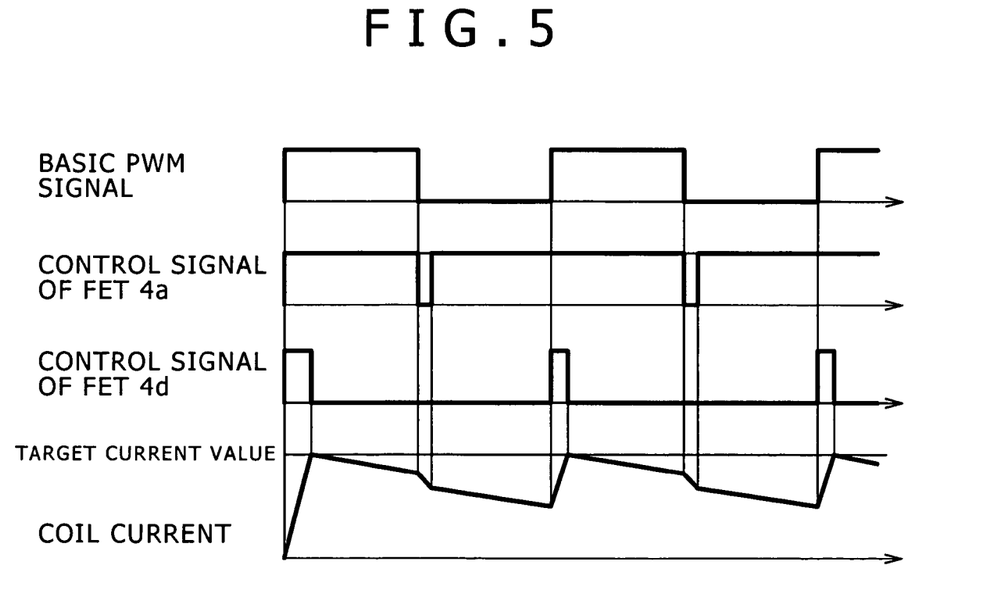
FIG. 5 is a graphical representation which is of assistance in explaining the operation of the stepping motor driving system shown in FIG. 4.

Referring now to FIG. 5, the operation of the stepping motor driving system shown in FIG. 4, namely, a stepping motor driving process according to the second embodiment will be discussed hereinafter. First of all, when the control signal generating means 50 outputs the control signals for causing the power MOSFET's 4a, 4d to be turned on and causing the power MOSFET's 4b, 4c to be turned off, the motor supply current is passed through the motor coil 2 and the coil current is increased. Then, when the supply time corresponding to the supply time signal elapses, the control signal generating means 50 outputs the control signals for causing the power MOSFET 4a to be turned on and causing the power MOSFET's 4b–4d to be turned off, so that the motor reflux current is passed through the motor coil 2 and the coil current is gradually decreased. Then, when predetermined time elapses from the time when the power MOSFET's 4a, 4d are turned on, the control signal generating means 50 outputs the control signals for causing the power MOSFET's 4a–4d to be turned off, so that the motor regeneration current is passed through the motor coil 2 and the coil current is decreased. Then, when the regeneration time elapses from the time when the power MOSFET's 4a–4d are turned off, the control signal generating means 50 outputs the control signals for causing the power MOSFET 4a to be turned on and causing the power MOSFET's 4b–4d to be turned off, so that the motor reflux current is passed through the motor coil 2 and the coil current is gradually decreased. Then, when predetermined time elapses from the time when the power MOSFET's 4a–4d are turned off, the control signal generating means 50 outputs the control signals for causing the power MOSFET's 4a, 4d to be turned on and causing the power MOSFET's 4b, 4c to be turned off, so that the motor supply current is passed through the motor coil 2 and the coil current is increased. Thereafter, the coil current is controlled in the same manner.

In this stepping motor driving system and this stepping motor driving process, the motor regeneration current is passed through the motor coil 2 until the regeneration time corresponding to the command speed passes, so that time required in order that the motor reflux current flows is varied depending upon the command speed (drive pattern). Therefore, distortion in the coil current is minimized and a ripple current is minimized. Consequently, a vibration of the motor is decreased regardless of the rotation speed of the stepping motor, high-speed rotation response characteristics are improved and a stepping angle precision of a micro step is improved. Furthermore, the control signal generating means 50 outputs the control signals for the power MOSFET's 4a–4d on the basis of the basic PWM signal of 50% duty, so that the control signal generating means 50 can generate control signals having stable PWM frequencies. Therefore, a vibration phenomenon can be prevented from occurring. Furthermore, all of the means constituting the switching element controlling means are comprised of the control IC 24 for performing the digitizing process, so that the number of parts is reduced and the stepping motor driving system can be therefore produced at low cost. Furthermore, the regeneration time is found on the basis of the command speed, so that even if sampling of the coil current can be performed only by a long period digitizing process, means for determining the regeneration time, namely, the regeneration time signal generating means 48 can be easily provided.

While the stepping motor driving system and the stepping motor driving process for driving the three-phase-stepping motor are referred to in the foregoing, it is apparent that the present invention may be applied to a stepping motor driving system and stepping motor driving process for driving another stepping motor.

The terms and expressions which have been employed are used as terms of description and not of limitation, and there is no intention in the use of such terms and expressions of excluding any equivalents of the features shown and described, or portions thereof, but it is recognized that various modifications are possible within the scope of the invention claimed.

What is claimed is:

1. A stepping motor driving system for driving a stepping motor having an independent winding, said stepping motor driving system comprising:
    a switching element for controlling current that flows through a motor coil;
    a current detecting means for detecting said current flowing through said motor coil; and
    a switching element controlling means for controlling said switching element on the basis of a motor current detection value that is an output of said current detection means;
    said switching element controlling means being adapted to control said switching element in such a manner that motor supply current is passed through said motor coil until said coil current detection value reaches an upper limit set point, motor reflux current is passed through said motor coil until predetermined time passes since said motor supply current begins to flow after said coil current detection value reached said upper limit set point, motor regeneration current is passed through said motor coil until said coil current detection value reaches a lower limit set point when said predetermined time passes, and motor reflux current is passed through said motor coil until predetermined time passes since said motor regeneration current begins to flow after said coil current detection value reached said lower limit set point.

2. A stepping motor driving system according to claim 1, wherein said switching element controlling means comprises a basic PWM signal generating means for generating a basic PWM signal of 50% duty, a set value generating means for outputting said upper limit set point when said PWM signal is ON, and outputting said lower limit set point when said PWM signal is OFF, a first comparator for making a comparison between said coil current detection value and said upper limit set point, a second comparator for making a comparison between said coil current detection value and said lower limit set point, a comparison signal generating means for generating a maximum comparison signal representing that said coil current detection value reaches said upper limit set point, and a minimum comparison signal representing that said coil current detection value reaches said lower limit set point, on the basis of said basic PWM signal and outputs of said first and second comparators, and a control signal generating means for generating control signals for said switching element, on the basis of an output of said comparison signal generating means.

3. A stepping motor driving system according to claim 1, wherein a 0–5V output signal current sensor is employed as said current detecting means.

4. A process for driving a stepping motor having an independent winding, utilizing a stepping motor driving system, said stepping motor driving system comprising:
    a switching element for controlling current that flows through a motor coil;
    a current detecting means for detecting said current flowing through said motor coil; and
    a switching element controlling means for controlling said switching element on the basis of a motor current detection value that is an output of said current detection means; and
    said stepping motor driving process comprising the steps of:
    controlling said switching element by said switching element controlling means;
    causing motor supply current to flow through said motor coil until said coil current detection value reaches an upper limit set point;
    causing motor reflux current to flow through said motor coil until predetermined time elapses since said motor supply current begins to flow after said coil current detection value reached said upper limit set point;
    causing motor regeneration current to flow through said motor coil until said coil current detection value reaches a lower limit set point when said predetermined time has passed; and
    causing motor reflux current to flow through said motor coil until predetermined time elapses since said motor regeneration current begins to flow after said coil current detection value reached said lower limit set point.

5. A stepping motor driving system for driving a stepping motor having an independent winding, said stepping motor driving system comprising:
    a switching element for controlling current that flows through a motor coil;
    a current detecting means for detecting said current flowing through said motor coil; and
    a switching element controlling means for controlling said switching element on the basis of a motor current detection value that is an output of said current detection means;
    said switching element controlling means being adapted to control said switching element in such a manner that motor supply current is passed through said motor coil until supply time corresponding to said coil current detection value and a target current value elapses, motor reflux current is passed through said motor coil until predetermined time passes since said motor supply current begins to flow after said supply time passed, motor regeneration current is passed through said motor coil until regeneration time corresponding to a command speed elapses when said predetermined time has passed, and motor reflux current is passed through said motor coil until predetermined time passes since said motor regeneration current begins to flow after said regeneration time passed.

6. A stepping motor driving system according to claim 5, wherein said switching element controlling means comprises a supply time signal generating means for generating a supply time signal corresponding to said supply time, on the basis of said target current value and said coil current detection value, a regeneration time signal generating means for generating a regeneration time signal corresponding to said regeneration time, on the basis of a command speed signal, and a control signal generating means for generating control signals for said switching element, on the basis of a basic PWM signal of 50% duty, said supply time signal, and said regeneration time signal.

7. A stepping motor driving system according to claim 5, wherein said switching element controlling means is designed so as to perform a digitizing process.

8. A process for driving a stepping motor having an independent winding, utilizing a stepping motor driving system, said stepping motor driving system comprising:
- a switching element for controlling current that flows through a motor coil;
- a current detecting means for detecting said current flowing through said motor coil; and
- a switching element controlling means for controlling said switching element on the basis of a motor current detection value that is an output of said current detection means; and said stepping motor driving process comprising the steps of:
- controlling said switching element by said switching element controlling means;
- causing motor supply current to flow through said motor coil until supply time corresponding to said coil current detection value and a target current value elapses;
- causing motor reflux current to flow through said motor coil until predetermined time elapses since said motor supply current begins to flow after said supply time passed;
- causing motor regeneration current to flow through said motor coil until regeneration time corresponding to a command speed elapses when said predetermined time has passed; and
- causing motor reflux current to flow through said motor coil until predetermined time elapses since said motor regeneration current begins to flow after said regeneration time passed.

* * * * *